US007293368B1

(12) United States Patent
Faulk et al.

(10) Patent No.: US 7,293,368 B1
(45) Date of Patent: Nov. 13, 2007

(54) MEASUREMENT SYSTEM AND METHOD (76) Inventors: Frank Faulk, 1580 Jamerson Rd., Marietta, GA (US) 30066; Richard C. Cope, 1003 Quaker Ridge Way, Duluth, GA (US) 30097

( * ) Notice: Subject to any disclaimer, the term of this patent is extended or adjusted under 35 U.S.C. 154(b) by 0 days.

(21) Appl. No.: 11/242,267

(22) Filed: Oct. 3, 2005

(51) Int. Cl.
*G01B 3/10* (2006.01)
*E06B 3/00* (2006.01)

(52) U.S. Cl. .............................. 33/758; 33/760; 33/194

(58) Field of Classification Search ................. 33/758, 33/1 F, 494, 759, 760, 194, 474
See application file for complete search history.

(56) References Cited

U.S. PATENT DOCUMENTS

| 2,803,062 | A | * | 8/1957 | Dutcher ........................ 33/340 |
| 5,012,590 | A | * | 5/1991 | Wagner et al. ................. 33/759 |
| 5,195,249 | A | | 3/1993 | Jackson |
| 5,528,517 | A | * | 6/1996 | Loken ........................... 702/156 |
| 5,881,471 | A | | 3/1999 | Kaluza |
| 6,108,918 | A | | 8/2000 | Ye |
| 6,145,206 | A | | 11/2000 | Piccirilo et al. |
| 6,349,478 | B1 | | 2/2002 | Ramsey, Jr. et al. |
| 6,865,817 | B2 | * | 3/2005 | Militello et al. .............. 33/194 |
| 6,959,499 | B2 | * | 11/2005 | Bini ............................ 33/511 |
| 2002/0064301 | A1 | | 5/2002 | Sonnenberg et al. |

FOREIGN PATENT DOCUMENTS

DE          19804198 A1 *   8/1998

* cited by examiner

*Primary Examiner*—Christopher W Fulton
(74) *Attorney, Agent, or Firm*—Lewinski Law Group LLC (57) ABSTRACT

An apparatus and method are provided for accurately recording measurements of a window and producing accurate window treatments. A reference strip is provided having measurement indicia thereon, such as a checkerboard pattern of squares of predetermined sizes. The reference strip may be placed proximate a window and photographed. The size of the window may be accurately determined from the resulting photograph using the associated reference strip. The window may also be measured and the measurements stored as biographic data and associated with the photograph to form an accurate and verifiable window biography. The biography may be provided to another party, such as a treatment manufacturer, who verifies the measurements of the biographic data using photograph and produces a suitable window treatment according to the measurements.

32 Claims, 10 Drawing Sheets

MEASUREMENT SYSTEM AND METHOD

FIELD OF THE INVENTION

The present invention relates to methods and systems of measurement. More particularly, the present invention relates to devices, systems, and methods for obtaining, recording, verifying, and providing accurate measurements.

BACKGROUND

It is often desirable to measure an object and provide the resulting measurements to another party. For example, one may measure a window, floor, wall, or room and provide the measurements to another party for the design, manufacture, and installation of products such as window treatments, carpeting, wall paper, etc.

The importance of obtaining accurate measurements and providing the accurate measurements to another party is illustrated by the window treatment industry. The building industry has created windows of varying sizes and shapes which have been incorporated into home designs in ways limited only by the imagination of architects and builders. An effective window treatment solution must be both decorative and functional and take into account the attributes and surroundings of each particular window to balance the practical aspects of light control and privacy with decorative and aesthetic factors. The successful design and manufacture of custom window treatments generally requires: accurately measuring the window; designing and producing a treatment in accordance with the accurate measurements; and installing the treatment.

The biggest stumbling block in the industry has proven to be the first step—the ability to efficiently obtain accurate and complete measurements of the windows. As indicated by the old carpenters' saying, "measure twice, cut once," it is only through accurate measurements of the windows and the delivery of these accurate measurements to designers and manufacturers that the efficient design, production and installation of window treatments can be accomplished. But inaccurate measurements remain a bane of the industry, often leading to window treatments that are unsuitable for installation and requiring the remeasuring of the windows and the remanufacture and reinstallation of the treatments. This results in increased costs, unacceptable delays, and unsatisfied customers.

The prior art method of providing window measurements generally consists of a worker making a sketch of a window. For example, a worker may draw a sketch of a window on paper and write the measurements of the window, the panes, and the space around the window on the sketch. This process is susceptible to errors and mistakes however, and even in cases where the sketch itself is accurate, critical information beneficial to designers and manufacturers is often omitted. For example, the person taking the measurements often fails to mention that there is a door, recess, or adjacent wall near the window that could affect the design, manufacture and installation of the treatment. Furthermore, a party receiving such a sketch has no way to readily verify its accuracy and therefore risks designing or manufacturing a treatment of the wrong dimensions. This is especially true when the actual manufacture of the treatment is done overseas, making it unrealistic for the manufacturer to take the measurements. Language barriers may further complicate matters. Thus, the manufacturer is often unable to obtain accurate and verifiable measurements prior to manufacture the risk of providing unacceptable product.

This inability to provide accurate and verifiable measurements ripples through the entire window treatment process. For example, parties that design window treatment solutions can ill afford to take time from their more profitable design tasks to travel to the installation site and take the measurements themselves. Instead, designers typically prefer to have someone else take the measurements and supply the measurements to them. Because these measurements are not readily verifiable however, inaccuracies in the measurements often go undetected resulting in unacceptable treatments which must be redone, often at significant cost.

While it is possible to photograph windows and provide the resulting photographs to another party, it is difficult to verify measurements associated with such photographs. For example, it is impractical to generate such photographs on a 1:1 scale with the actual window so a user can measure the photographic image of the window to determine the measurements of the actual window. Instead, a viewer must attempt to convert the size of an object in a photograph to the size of the actual object by using some sort of conversion factor. But photographs can be taken from a variety of angles and distances making it difficult to derive a standard conversion scale. Perspective is one effect that prevents the easy and accurate determination of the size of an object from a photograph. Perspective is the phenomena whereby the apparent size of an object decreases with increasing distance from the eye. For example, parallel lines, such as railroad tracks, may appear to converge in the distance to a central vanishing point. Accordingly, objects that are closer to a camera appear larger in a resulting photograph than objects that are further away when the photograph is taken. Further complicating the matter are distortions which often affect images. For example, two common optical distortions are barrel distortion and pin cushion distortion which make objects appear stretched or compressed from their actual dimensions. Distortions may also result from the particular viewing mechanism used to view the photograph, such as a computer monitor. Thus, a typical photograph of a window does not provide a viewer of the photograph with a complete and verifiable biography of the window from which to generate window treatments. While the above discussion relates to windows and window treatments, similar problems and issues arise when measuring other objects.

There is a need for a method and system for obtaining and providing accurate and verifiable measurements. There is also a need for a method and system that allows for the easy and accurate determination of the size of an object from a photograph. There is also a need for a method and system for efficiently and cost effectively providing custom window treatments.

SUMMARY OF THE INVENTION

The present invention improves the accuracy of measurements and associated biographic data and provides for the easy verification of such information. In an exemplary embodiment of the invention an inventive reference tool is provided for assisting in the determination of measurements from an image of the reference tool and the object being measured. For example, the reference tool may comprise a reference strip that includes indicia of predetermined units of measurement (inches, centimeters, or other units or combination of units) displayed so as to be visible in an image taken of the window. Such a reference strip may be placed vertically, horizontally or in whatever direction necessary across, around or by a window so that it is visible in a recorded image of the window, such as a photograph. The indicia may include geometric shapes of predetermined sizes arranged in a predetermined pattern. For example, a plurality of squares may be arranged in a checkerboard pattern. The indicia provide a reference for determining the dimensions of the window from the image. For example, if one-inch squares are provided on the reference strip, then one may simply count the number of squares in the image that are adjacent to the particular window feature to be measured and multiply by one inch to determine the actual size of that feature.

In another exemplary embodiment of the invention the reference tool may be an L-shaped fixture of predetermined dimensions. In one exemplary embodiment the fixture may have a first side of a length of approximately 20 inches and a second side of a length of approximately 18 inches to correspond with the typical size of valance treatments. By positioning the fixture at a window the mounting position of the valance treatment may be readily determined. The fixture may be of other sizes. For example, in another exemplary embodiment an L-shaped fixture may have a first side of 12 inches and a second side of 14 inches to assist in determining the mounting position of other treatments such as cornices. By recording an image of the fixture and the window a viewer of the image can determine the location of the valance treatment. The reference strip and L-shaped fixture may be used in conjunction with one another and an image recorded of both the reference strip and the L-shaped fixture.

For convenience, the invention is discussed below in the context of the measurements of windows and the installation of window treatments but it will be understood that the invention may be employed in other contexts and used to measure other objects and assist in other endeavors. By way of example and not of limitation the invention may be used to measure rooms, floors, walls, etc. and used for other installations, such as carpeting, wall paper, etc. Furthermore, although the image recording device may be referred to as a camera and the image referred to as a photograph, the invention contemplates the use of other image recording devices and the generation of other types of images. Therefore, it will be understood that the term photograph herein is not limited to an actual photographic print, but is meant to include images of all manner of formats and displays. Such images may be created by a wide variety of image recording devices such as a film camera, digital camera, camcorder, camera phone, PDA, etc. Once created, the image may be stored on film, a computer readable medium, or other media in a variety of different formats and then later displayed on a variety of displays. For example, a user may use a digital camera to record a digital image of a window and reference strip on the camera's memory device, transfer the image to a computer, and display the image on a computer display or print out the image in hard copy. By storing the image in a computer readable format the image may be easily transmitted via a variety of communications networks such as the Internet. In an exemplary method of the invention, a reference strip is placed proximate a window and the window and the reference strip are photographed. In one exemplary embodiment, which may be of particularly good use for rectangular-shaped windows, a reference strip may be placed proximate the window in a generally horizontal direction and another reference strip may be placed proximate the window in a generally vertical direction for measuring the window horizontally and vertically respectively. Of course the strips may be of a variety of shapes and placed in a variety of positions on, at, or near the window. For example, curved strips may be provided for use with curved windows.

In addition to an image of the window and associated reference strips, additional biographic information may also be provided to form a detailed biography of the window. By way of example and not of limitation, such information may include: a list of standard measurements commonly used in designing, manufacturing, and installing window treatments; the address where the window is located; the name of the purchaser; the name of the party taking the biography; and invoice numbers. In one exemplary embodiment the biographic data can be used to form a work order for the manufacture or installation of the treatments. This biographic information may be provided in a separate file and associated with the image or it may be included in the photograph itself, such as by writing the information on the reference strips prior to recording the image, or it may be provided by some other means. In addition, the image may also include the L-shaped fixture or some other fixture of predetermined dimensions.

The image and the biographic data form an accurate and verifiable window biography. The reference strip, shown in the image proximate the window, serves as a reference system for determining the dimensions of the window from the photograph. These dimensions may then be compared with the measurements provided as part of the biographic data to confirm the accuracy of those measurements.

The appearance of an object in an image, such as a photographic image, depends upon a variety of factors including the angle, location, and perspective of the image recording device relative to the object when the image is taken as well as various distortions that may affect the image. Because the reference strip has indicia of known size, it allows for the accurate determination of window measurements from the photograph regardless of the angle, location, and perspective from which it was taken. Furthermore, the reference strip image distorts in concert with the distortion of the window image so that accurate measurements may be determined even when it is distorted. For example, a first portion of a window that is closer to a camera when a photograph is taken may appear larger in the photograph than a second portion that is further from the camera due to the perspective. But when a reference strip has been applied to the window and photographed with the window, the measurement indicia on the reference strip that is proximate the first portion of the window will appear larger than the reference indicia located proximate the second portion of the window. In other words, the reference strip and the window will have the same perspective and "distort" in the same manner so that the reference strip and window maintain their relative sizes, thereby correcting for any perspective and distortion effects. A party that knows the size of the reference indicia may simply count the number of reference indicia located proximate the portion to be measured to determine that actual size of that portion. For example, when trying to measure a portion of an object at the center of a photograph one may use the reference units located near the center of the photograph and when trying to measure a portion at the edge of the photograph one would use the reference units at the edge of the photograph, as the center and the edge of the photograph may be distorted differently.

In an exemplary embodiment of an apparatus of the invention a reference strip is provided having measurement indicia for determining the dimensions of a window from a recorded image of the reference strip and the window. In one exemplary embodiment the indicia includes squares in a checkerboard pattern and numerals. An exemplary method of the invention includes placing a reference strip proximate a window and recording an image of the reference strip and the window so that the dimensions of the window may be determined from the image. The window may also be measured to generate biographic data which may be saved and associated with the image to form a biography. A party receiving the biography may then verify the measurements of the biography from the image and then manufacture a treatment in accordance with the verified measurements.

By incorporating the reference strips into the photograph along with the biographic information measurements can be verified to ensure the manufacture and installation of an acceptable treatment solution and thereby eliminate the lost time and revenue resulting from inaccurate measurements. The present invention also allows relatively unskilled personnel to take measurements and provide the measurements to a third party for verification. While the present invention has been discussed in connection with window treatments, the present invention is not limited to window treatments but may be used for generating, verifying, and providing measurements for a variety of objects.

DETAILED DESCRIPTION OF EXEMPLARY EMBODIMENTS

As required, exemplary embodiments of the present invention are disclosed herein. These embodiments should be viewed with the knowledge that they are only examples and that the invention may be embodied in many various and alternative forms. The figures are not to scale and some features may be exaggerated or minimized to show details of particular elements, while related elements may have been eliminated to prevent obscuring novel aspects. Well known structures and functions have not been shown or described in detail to avoid unnecessarily obscuring the description of the embodiments of the invention. Therefore, specific structural and functional details disclosed herein are not to be interpreted as limiting, but merely as a basis for the claims and as a representative basis for teaching one skilled in the art to variously employ the present invention.

Figure 1:
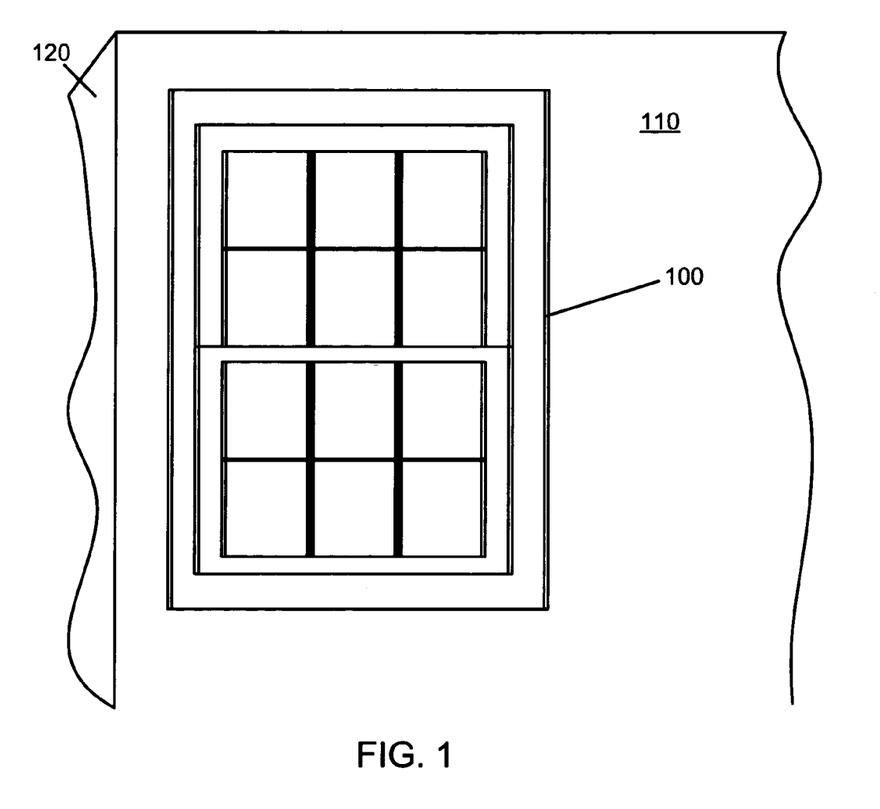
FIG. 1 shows a window for which a window treatment may be generated in accordance with the invention.
Figure 2:
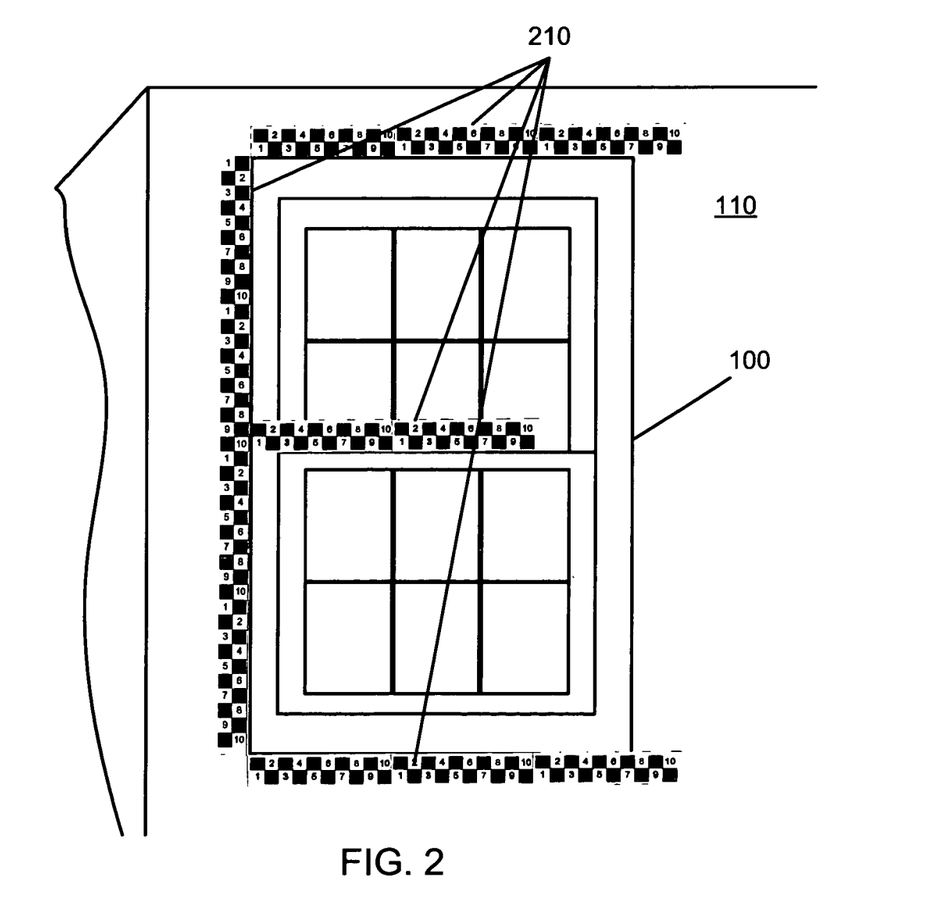
FIG. 2 shows a system for generating a biography in accordance with an exemplary embodiment of the invention.

Turning to the figures wherein like numerals represent like elements throughout, FIG. 1 illustrates a window 100 for which a custom window treatment may be provided. The window 100 is installed in a wall 110. Another wall 120 extends perpendicular to the first wall 110. FIG. 2 illustrates an exemplary system 200 of the present invention for generating a window biography for the window 100 shown in FIG. 1. The system 200 includes reference strips 210 that are placed proximate the window 100 so that a worker may photograph the window 100 and reference strips 210 to produce an image 310 (FIG. 3) of the window 100 and reference strips 210 as discussed in detail herein.

As shown in FIG. 2, a reference strip 210 may be provided at the window 100 so that the reference strips are proximate a portion of the window 100 for which measurements are desired. For rectangular windows such as that shown in FIG. 1, reference strips may be provided in generally horizontal and vertical directions so that the strips 210 extend along the edges of the window 100. But the reference strips 210 may be provided in other ways, such as across portions of the window 100. Preferably reference strips 210 are placed proximate the portions of the window that will be measured.

Figure 3:
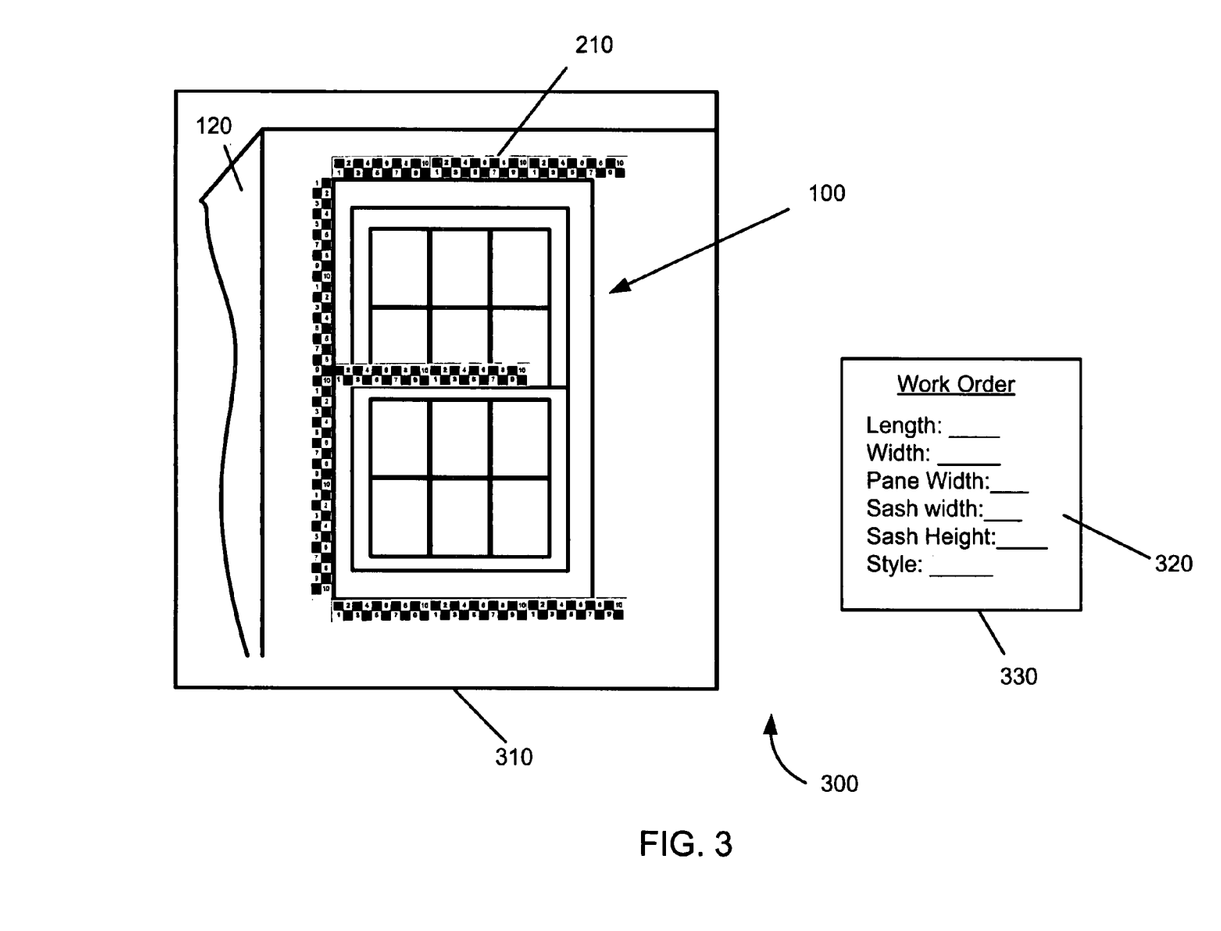
FIG. 3 shows a biography of the window of FIG. 1 created in accordance with an exemplary embodiment of the invention.

As shown in FIG. 3, an image 310 of the reference strips 210 and the window 100 may be generated to provide a viewer of the image 310 the ability to determine the dimensions of the window 100 and its various elements. The image 310 may be a photographic print or an image recorded in some other format, such as a format for storage on a computer readable medium. For example, a digital camera may be used to capture and store a photographic image. The image may be stored in a variety of file formats and data compression formats such as TIFF, RAW, JPEG, PDF, JFIF, or other formats and displayed by a variety of display devices, such as a computer monitor, PDA, mobile telephone, iPod, camcorder, television monitor, display terminal, or other display device.

A biography 300 may be created which includes the image 310 and associated biographic information 320. Preferably the biographic information 320 includes measurements of the window 100, such as the measurements associated with features of the window 100 that affect the design, construction, and installation of a window treatment. The biographic information 320 may also include additional information such as the address where the treatments will be installed, associated work order or invoice numbers, the paying party's name, the name of the party performing the measurements, a description of surrounding features, etc. Preferably, each window will have its own biography 300 including an image of the window 100 and the reference strips 210 as well as a list of measurements.

The biographic information 320 may be displayed with the reference strip 210 and the window 100 so that the biographic information 320 is recorded as part of the image 310. For example, the biographic information 320 could be written on a portion of the reference strip 210 that is adapted for receiving such writing. Or such information could be provided separately from the image 310 such as within an associated computer file, such as a computer spreadsheet. This file may also serve as a work order for ordering the manufacture of a treatment for the window 100.

Figure 4:
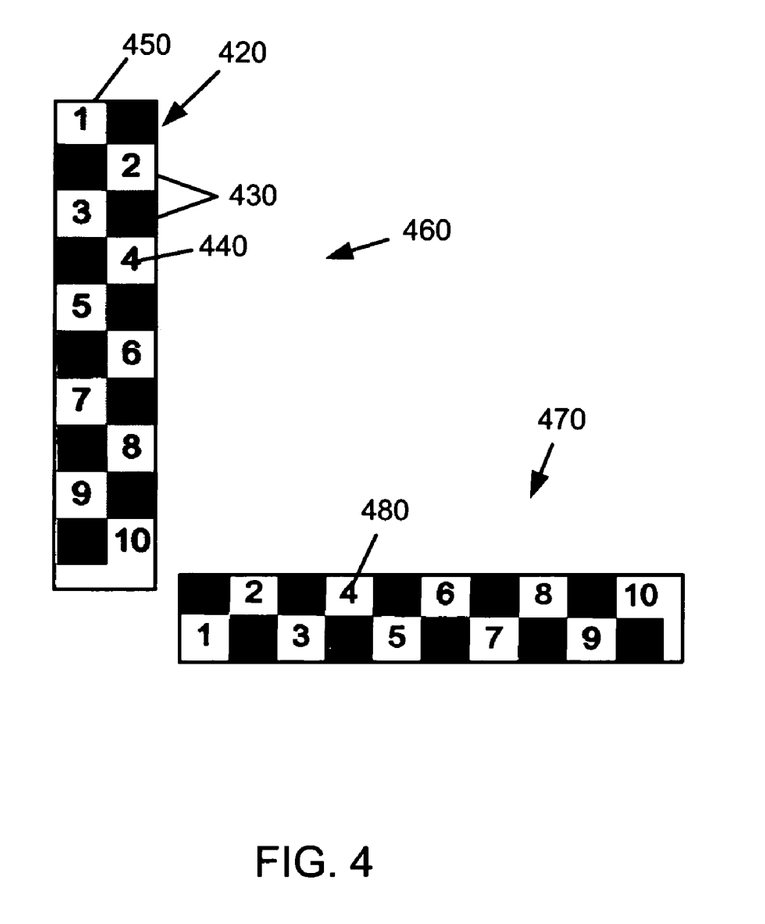
FIG. 4 shows a reference strip in accordance with an exemplary embodiment of the invention.

As best shown in FIG. 4, a reference strip 210 may include measurement indicia 420 that represent standard units of measurements. For example, squares 430 of a predetermined size, such as a square inch, may be provided. The indicia 420 may be provided in a variety of colors or patterns to assist the viewer in distinguishing the indicia in a photograph. Applicant has found that a black and white checkered pattern works well and is readily visible in photographs. By providing such a pattern, distortions of the image are readily discerned as the changes from the checkered pattern are apparent. A variety of indicia may be provided on the reference strip 210 to indicate various measurement units and subunits. For example, numbers 440 may be provided to indicate various units of measurement, such as the distance from an end 450 of the reference strip, such as inches. The reference strips 210 may also be adapted for placement in particular orientations. For example, a vertical reference strip 460 may be provided with numbers 470 thereon which are oriented so that they are easily read when the reference strip 460 is placed in a vertical direction. Likewise, a horizontal reference strip 470 may have numbers 480 which are oriented to be easily read when the reference strip is oriented in a horizontal direction.

The reference strips 210 may be made of any suitable material such as paper, film, cloth or the like. Applicant has found that strips made of high-density polyethylene fibers and sold under the brand name Tyvek® available from DuPont work well. Although the reference strips 210 are shown as rectangular strips, they may be of a variety of shapes and sizes. Applicant has found that rectangular strips having one inch squares in a checkerboard pattern work well with rectangular shaped windows. The reference strip 210 may be slightly longer than the measuring indicia 420 thereon to allow for a slight overlap of two adjoining reference strips 210 without obscuring the reference indicia 420. Applicant has found that a checkerboard pattern of ten one inch rows on a 10½" strip works well, but other lengths may be used such as 12". Of course it is contemplated that other shapes and sizes may be used such as arcuate shaped strips for use with curved windows.

Preferably an exposable adhesive layer is provided on a back surface of the reference strip 110 so that the reference strip 110 may be temporarily applied to a window, wall, or other surface and removed without damaging the surface to which it is attached. A removable protective layer (not shown) may also be provided atop the exposable adhesive layer so that removal of the protective layer exposes the adhesive layer for mounting the strip. Alternatively, the reference strips may be mounted using tape, pins, fasteners, or other means.

As discussed above, a party measuring the window 100 may provide biographic information 320, such as a list of measurements of the window, along with the image 310. As shown in FIG. 3 this biographic data may be stored in a file 330 and include such measurements as the length, width, pane width, sash width, sash height, style, etc. This data is preferably stored in a computer file so that it may be provided to a third party such as by email, fax, or some other communications method.

By photographing the reference strip 210 and the window 100 an image 310 of the window 100 and the reference strip 210 is created which provides a viewer of the image 310 the ability to verify the dimensions of the window 100. For example, a viewer of the biography 300 illustrated in FIG. 3 can confirm the measurements provided in the biographic data 320 by using the image of the reference strip 210 to measure the dimensions of the window 100. The dimensions of the window 100 of FIG. 3 may be determined by simply counting the number of squares on the horizontal reference strip 210 shown in the image adjacent the window and multiplying by the size of the reference squares. For example, if the biographic information 320 states that the length of a particular portion of the window 100 (such as the top of the frame) is 30 inches, then a viewer of the image 310 can quickly count the number of squares on the reference strip 210 that run along the portion in question to determine if the provided measurement is accurate. If there are thirty squares that run the length of the portion, then the biographical data is correct. The system thereby provides a means to provide an accurate and verifiable biography 300 to another party without the need of a worker making a sketch of the window 100.

Another advantage of the biography 300 of the present invention is that in addition to providing the dimensions of the window 100 in a verifiable form, it also provides information about the window's 100 environment. In the example shown in FIG. 3 for instance, it is apparent from the image 310 of the biography 300 that a wall 120 is in close proximity to the window 100 thereby allowing a party preparing to manufacture or install a treatment for the window 100 to take the wall 120 into account. For example, an installer may view the image to select the proper hardware for the installation prior to arriving at the installation site.

The image 310 may also be used in conjunction with various templates to generate possible treatment solutions. For example, templates may be placed atop the window image to illustrate how a proposed treatment will look when installed. This may be performed electronically using software, such as PhotoShop® available from Adobe Systems, Inc. or other image processing software. These proposed solutions may then be provided to a party, such as an interior designer for review and selection. Once a solution is selected, a work order may be generated and sent to a manufacturer for production of the selected treatment. A collaborative communications session may also be used. In addition, the reference strip or reference fixture may be "lifted" out of the photographic image and used to scale the recommended treatment for mounting height, valance drops, etc. The window biography measurements may then be used to order a treatment solution for each specific window. The measurements may also be used to determine hardware alternatives, mounting options, fabric yardage calculation, and work order specification. A manufacturer may receive the order, verify the measurements as discussed above, and produce the treatment.

Figure 5A:
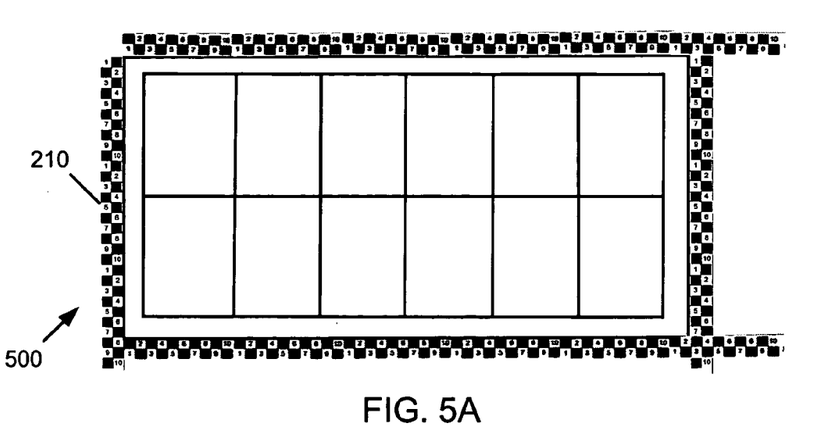
FIG. 5A shows a window for which a window treatment may be provided in accordance with the invention.
Figure 5B:
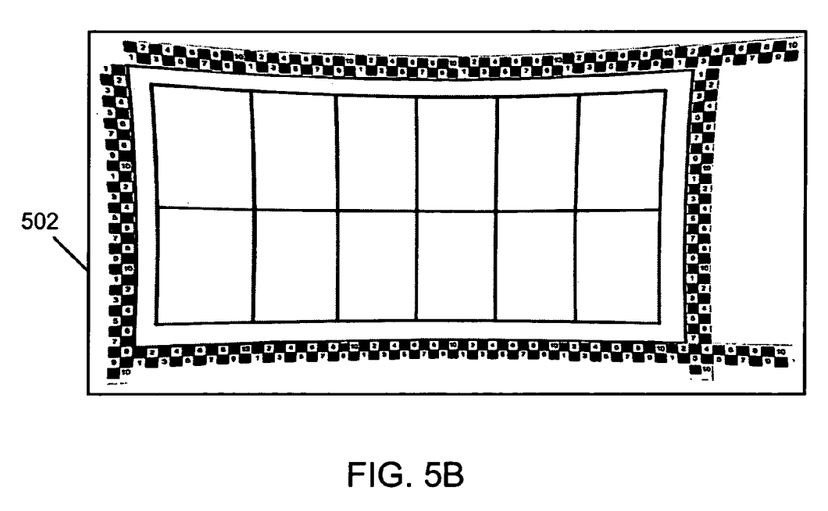
FIG. 5B shows an example of a picture taken of the window of FIG. 5A and a reference strip in accordance with an exemplary embodiment of the invention in which the picture has barrel distortion.
Figure 5C:
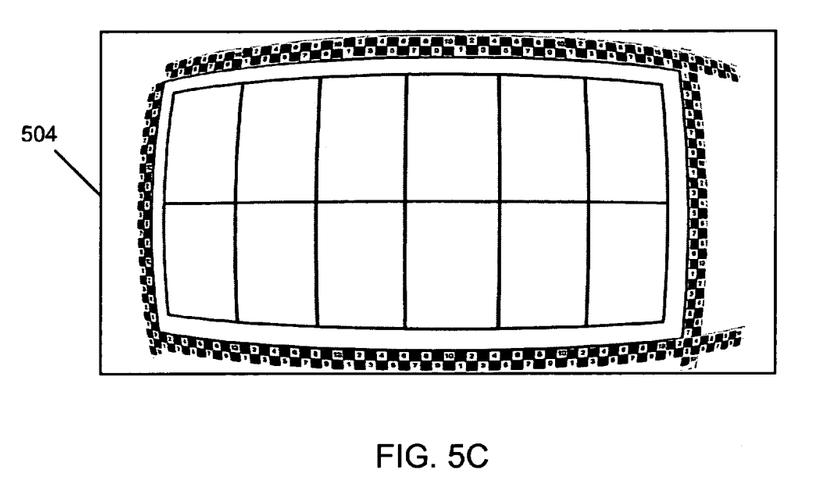
FIG. 5C shows an example of a picture taken of the window of FIG. 5A and a reference strip in accordance with an exemplary embodiment of the invention in which the picture has pincushion distortion.
Figure 5D:
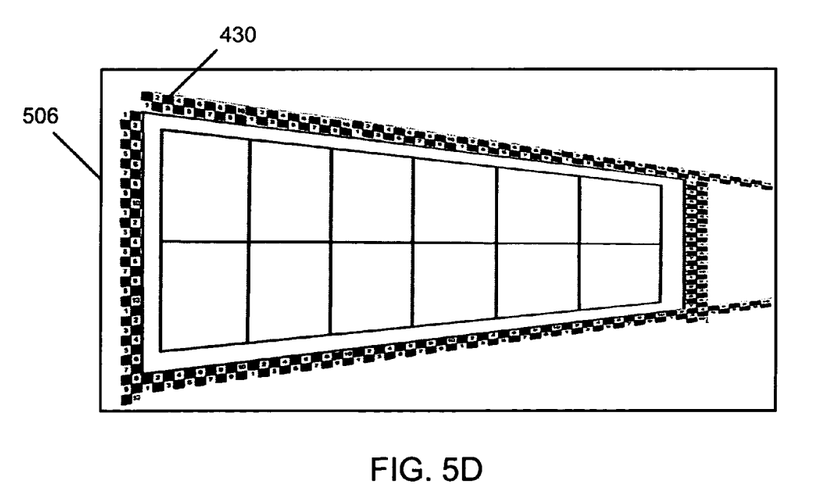
FIG. 5D shows an example of a picture taken of the window of FIG. 5A from a first perspective.
Figure 5E:
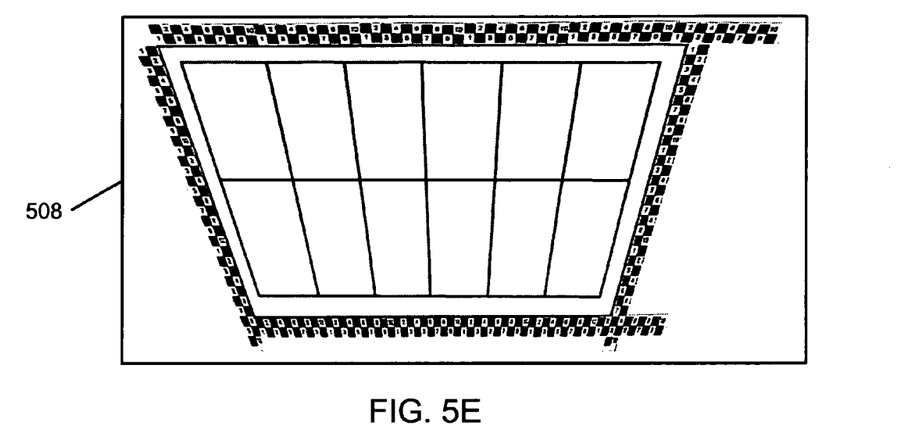
FIG. 5E shows an example of a picture taken of the window of FIG. 5A from a second perspective.
Figure 5F:
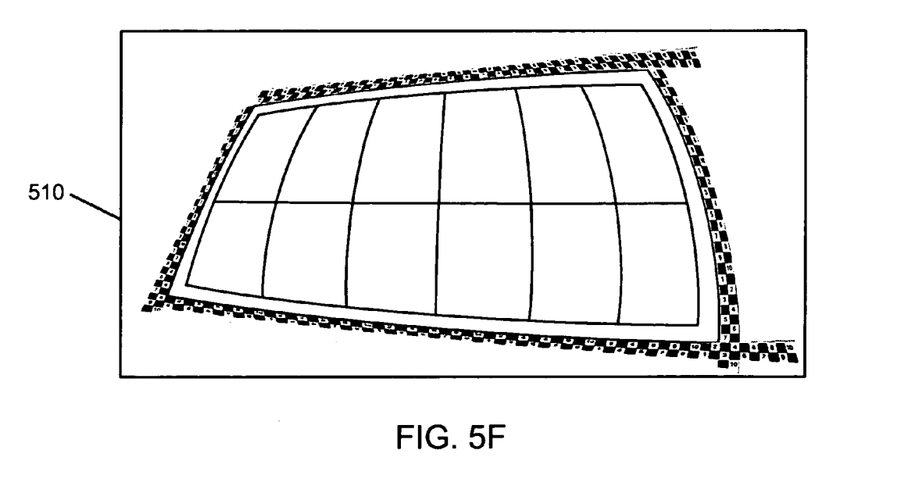
FIG. 5F shows an example of a picture of the window of FIG. 5A in which the picture has another distortion.

Another advantage of the present invention is that it provides for the verifiability of the measurements of a window even when images are taken from different perspectives or the images are distorted. By providing the reference tape 210 proximate the window 100 distortions are taken into account as the reference strip 210 distorts along with the window 100. For example, FIG. 5A shows an example of a window 500 for which it is desired to create and install a window treatment to which reference tape 210 has been provided. FIG. 5B shows a biography image 502 of the window 500 having pincushion distortion. FIG. 5C shows an example of a biography image 504 of the window 500 having barrel distortion. FIG. 5D shows an example of a biography image 506 of the window 500 taken from a first perspective. FIG. 5E shows an example of a biography image 508 of the window 500 from a second perspective. FIG. 5E shows an example of a biography 510 of the window 500 having another distortion.

As seen in FIGS. 5B-5E, the reference strips 210 are distorted in the same manner as the window 500. This allows a viewer of the image 504 to determine the measurements of the window 500 from the images 502,504,506,508,510. If a user desires to know the width of then the user may simply count the indicia squares 430 proximate this area and multiply by the appropriate conversion factor. For example, FIG. 5D shows a sample biographic image 506 of the window 500 of FIG. 5A taken from a perspective such that the left portion of the window 500 appears larger than the right portion of the window 500. But as also seen in FIG. 5D, the reference squares 430 of the reference strip 210 are also larger to the left and smaller to the right due to the perspective of the photograph. Thus, as the window 500 appears to get smaller so do the reference squares, thereby providing a consistent reference for the size of the window 500. This is evident by the fact that if a party measured the size of a reference square 430 at the left side of the image 506 the square 430 would be larger than a reference square at the right side of the image.

Figure 6:
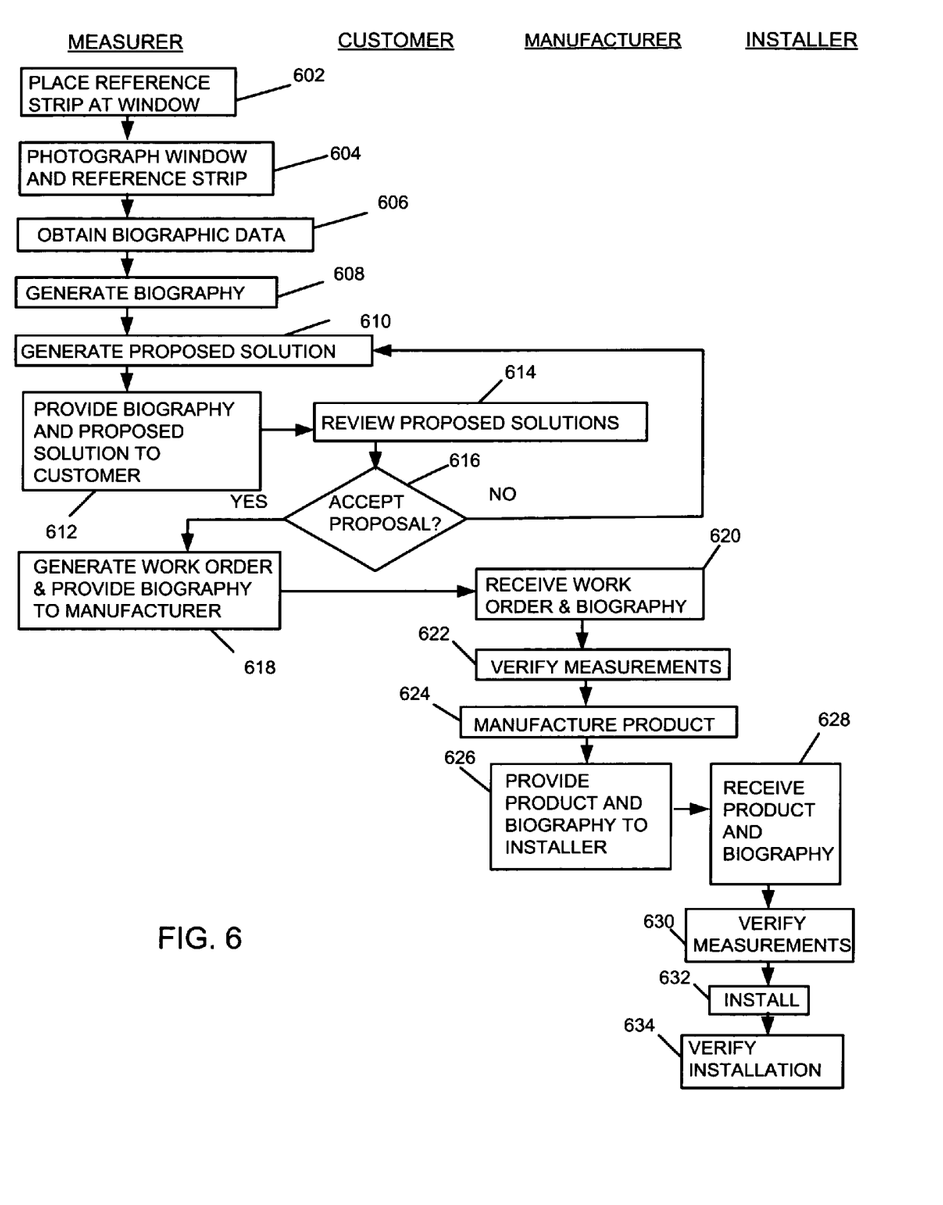
FIG. 6 shows a method in accordance with an exemplary embodiment of the invention.

FIG. 6 shows an exemplary embodiment of a method for making and installing window treatments in accordance with an exemplary embodiment of the invention in which a biography of the window is generated and a treatment is manufactured and installed. For convenience, separate columns have been provided for tasks that may be performed by different parties, although it is contemplated that a party may perform tasks that are shown as being performed by a different party in FIG. 6. For example, the party measuring the window may or may not be the party installing the treatment.

At block 602 a reference strip 210 is provided proximate a window 100. As previously discussed, one or more reference strips 210 may be provided and they may be provided at a variety of positions and orientations. At block 604 the window 100 and the reference strip 210 are photographed. In a preferred embodiment a digital camera may be used to generate and store a digital image. The image may then be sent electronically to a variety of devices. For example, the image may be downloaded to a laptop computer or other device for viewing or sent via email to another party's computer.

At block 606 biographic data 320 for the window 100 is generated. Preferably the window 100 is measured by known means such as a measuring tape and the window's dimensions are recorded as part of the biographic data 320. For example, a form may be provided which lists the portion of the window to be measured. This form may be in electronic format, such as an input screen on a database program so that the measurements may be easily input, stored and associated with a particular window to which it relates. The photographic image 310 and the related biographic information 320 may then be saved and associated to form a biography 300 of the window 100 at block 608.

Figure 9A:
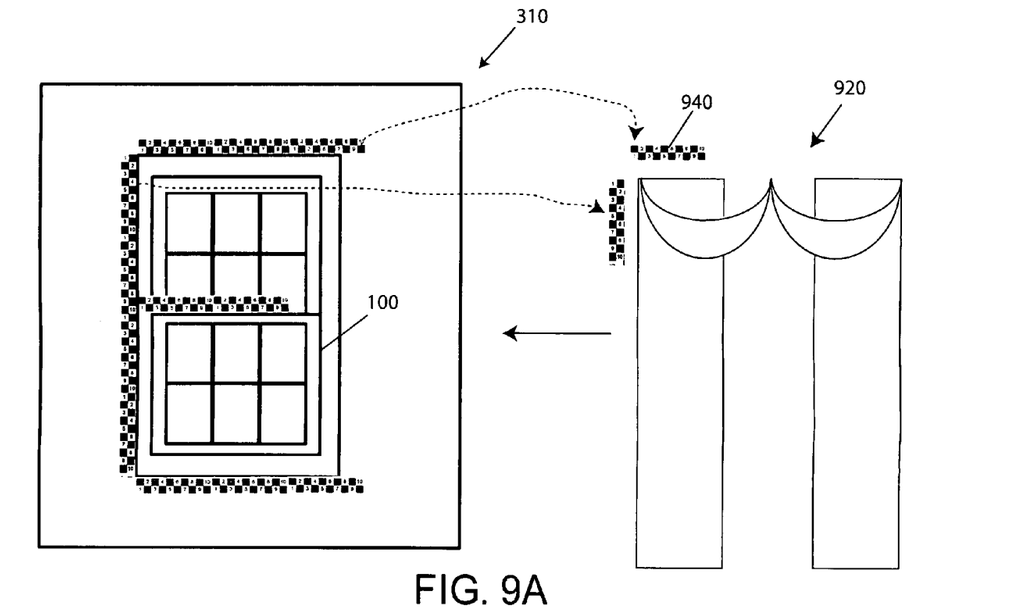
FIG. 9A shows an image with a template in accordance with an exemplary embodiment of the invention.
Figure 9B:
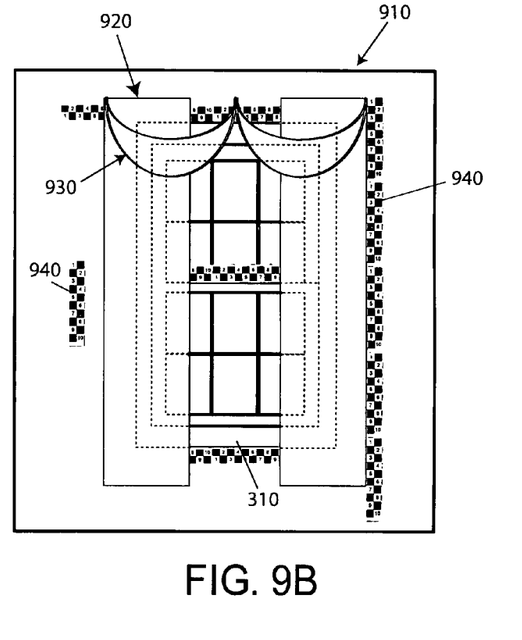
FIG. 9B shows a treatment solution in accordance with an exemplary embodiment of the invention.

A proposed window treatment solution 910 may be developed at block 610. This proposed solution 910 may include the use of templates 920 (FIG. 9A) in conjunction with the photographic image 310 of the window 100. For example, as shown in FIG. 9B, different treatment solutions 920 may be superimposed over the window image 310. This may be performed by various software programs. The reference strip 940 can be lifted out of the image 310 and used to scale the recommended treatment 910 for mounting height, valance drops, etc. Alternatively, a hard copy of the image 310 may be printed and templates placed atop the hard copy.

The proposed solution or solutions may be provided to a customer, such as an interior designer, for review and approval at block 612. For example, the proposed solutions may be saved in a computer file and transmitted to a customer by various means, such as email, web posting, etc. In one embodiment a collaborative communications session may be established between the party generating the proposed solution and the customer. For example, the biography may be posted on a website for review by a party. A web collaboration session may also be established so that the customer may view the proposed solutions interactively on a web site. The ruler may be used to show the scale of the window to a party and the scale of the treatment during the collaborative session. Alternatively, the proposed solutions may be saved and sent to the decision maker using a communications network, such as emailing the proposed solutions over the Internet.

At block 616 a test is performed whether a solution has been selected. If not, then new solutions may be developed at block 610. If a solution is approved, then a work order may be generated and sent to a manufacturer along with the biography 300 at block 618. The biography 300 may include the photograph 310 of the window 100 and reference strip 210 as well as the biographic data 320 including the measurements. In one embodiment the biographic data may be provided in the form of a work order. The manufacturer receives the work order and biography at block 620 and at block 622 verifies the accuracy of the measurements provided using the photograph 310. After verifying the accuracy of the measurements, the treatment may then be manufactured in accordance with the measurements at block 624. The treatment may then be provided to the installer at block 626. The installer receives the treatment biography at step 628 and may verify the measurements at step 630. The treatment may then be installed at step 632. Because the installer is provided with an accurate biography with verifiable measurements the installer can properly prepare for the installation prior to arriving at the installation site. For example, the installer can collect all necessary hardware and tools taking into account the data provided by the biography such as the location of walls, doors, etc. While in the example shown in FIG. 6, the biography was provided to the installer by the manufacturer, it is contemplated that the biography could be provided by other parties. In addition, the customer shown in FIG. 6 may be the actual consumer or it could be an agent for the consumer such as an interior designer. Furthermore, a party may perform multiple tasks. For example, the manufacturer of the treatment may also be the installer or the measurer may be the installer.

At step 634 the installation may then be verified. For example, after installation of the treatments the installer may take a photograph of the completed installation and provide it to the customer, designer, or other party to confirm the installation. The reference strips may also be provided and photographed with the completed installation to assist a viewer of the image in determining if the installation is acceptable. This would allow for the payment of the installer without the paying party having to travel to the site for inspection.

Figure 7:
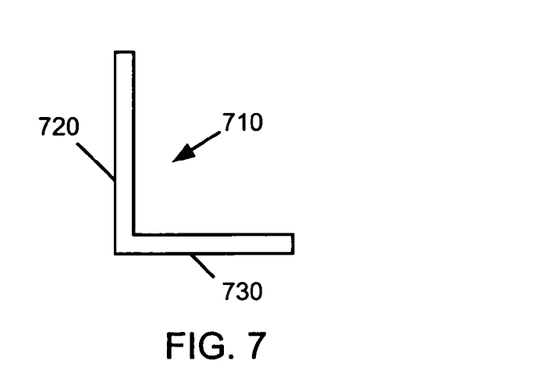
FIG. 7 shows a reference fixture in accordance with an exemplary embodiment of the invention.
Figure 8:
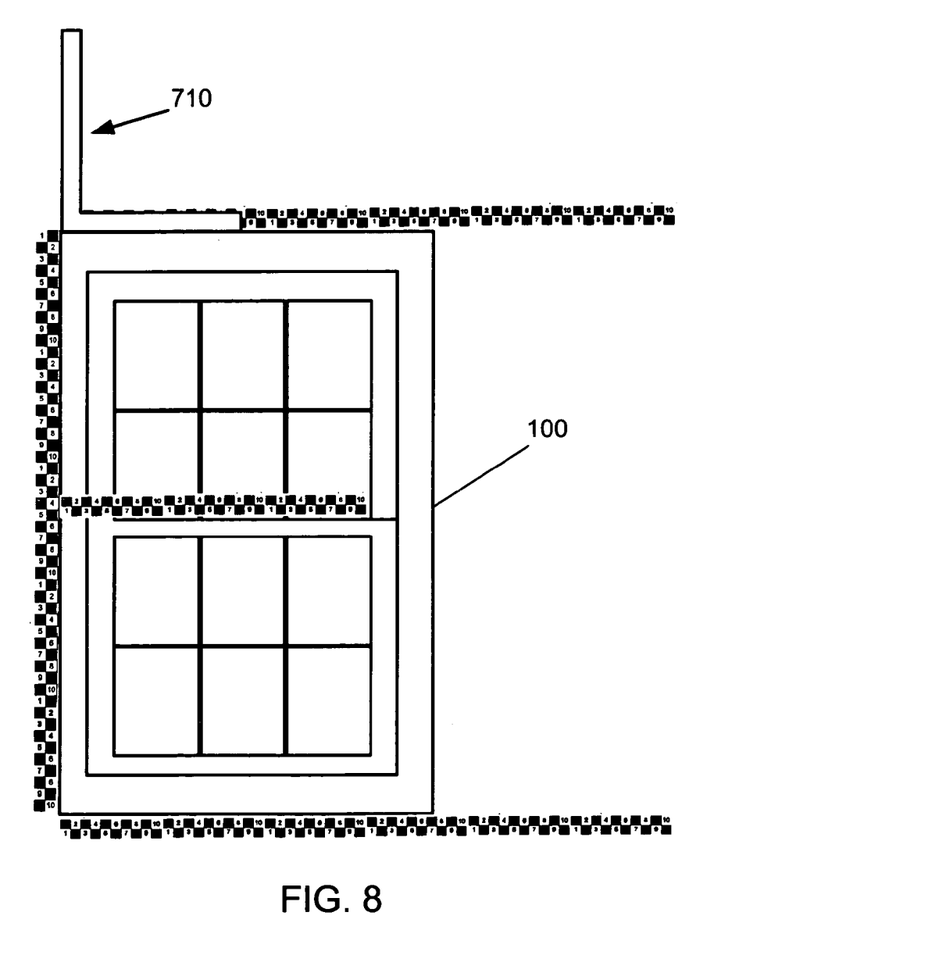
FIG. 8 shows the reference fixture of FIG. 7 placed proximate a window in accordance with an exemplary embodiment of the invention.

FIG. 7 shows an exemplary embodiment of a reference tool in the form of an L-shaped fixture 710. The fixture may be of various sizes. In one exemplary embodiment the fixture 710 has first 720 and second 730 sides of predetermined length. In one exemplary embodiment the first side 720 is approximately 20 inches and the second side 730 is approximately 18 inches in length to correspond to the typical mounting positions of valances relative to a window. Fixtures of other sizes may also be used such as an L-shaped fixture having first and second sides of 12 and 14 inches to approximate the mounting position of cornices. As shown in FIG. 8 the L-shaped fixture 710 may be placed at the window 100 to assist in determining the mounting location of a product, such as a valance treatment mount. As described above, the fixture 710 may be photographed with the window to provide a viewer of the resulting image with an estimate of the location of the valance treatment. As shown in FIG. 8, the L-shaped fixture 710 may be used in conjunction with reference strips 210.

Again, the illustrated and described embodiments of the present invention contained herein are exemplary examples set forth for a clear understanding of the invention and are not intended to be interpreted as limitations. Variations and modifications may be made to the above-described embodiments, and the embodiments may be combined, without departing from the scope of the claims.

What is claimed is:

1. An apparatus, comprising:
a reference strip adapted to provide for the measurement of an object from an image of the object and the reference strip, said reference strip adapted for being placed on a surface near the object to be measured, said reference strip having measurement indicia thereon, said measurement indicia comprising a checkerboard pattern.

2. The apparatus of claim 1 further comprising a plurality of number indicia representing a predetermined distance from an end of the reference strip.

3. The apparatus of claim 1 further comprising an adhesive layer adapted for attaching said reference strip to a surface.

4. The apparatus of claim 3 further comprising a removable layer, said removable layer atop the adhesive layer such that when said removable layer is removed said adhesive layer is exposed.

5. The apparatus of claim 1 wherein a blank portion is provided adjacent said measurement indicia so that a first reference strip may be provided atop a second reference strip without obscuring the measurement indicia.

6. A method of providing window treatments, comprising:
placing a reference tool proximate a window;
recording an image of the window and the reference tool; and generating a biography of the window, said biography including the image and associated biographical data.

7. The method of claim 6, wherein said reference tool comprises a reference strip.

8. The method of claim 7, wherein said reference strip comprises a strip of material having measurement indicia thereon, said measurement indicia comprising a plurality of geometric shapes of predetermined size arranged in a predetermined pattern.

9. The method of claim 8 wherein said reference indicia comprises a plurality of squares arranged in a checkerboard pattern.

10. The method of claim 6, further comprising the step of generating a proposed window treatment solution based upon said biography.

11. The method of claim 10, wherein said step of generating a proposed window treatment solution comprises providing a template to said image.

12. The method of claim 11, further comprising providing said proposed window treatment solution to a customer for approval.

13. The method of claim 10 further comprising manufacturing a window treatment in accordance with said proposed window treatment solution.

14. The method of claim 10, wherein said step of generating a proposed window treatment solution comprises manipulating the image.

15. The method of claim 10, further comprising manufacturing a treatment in accordance with said biography.

16. The method of claim 6, wherein said step of recording an image of the window and the reference tool comprises photographing the window and reference tool.

17. The method of claim 6, wherein said biographic data includes at least one measurement of the window.

18. The method of claim 6, further comprising verifying the biographic data using the image.

19. The method of claim 18, wherein said step of verifying the biographic data using the image comprises determining the size of the window using the reference strip in the image.

20. A method of determining the size of an object from an image, comprising:
placing a reference strip proximate an object;
recording an image of the object and the reference strip;
obtaining biographic data about the object;
generating a biography of the object; and
providing the biography to a party for the construction of an item associated with the object.

21. The method of claim 20 further comprising, determining the size of the object by measuring the object using the reference strip in the image.

22. A method of manufacturing a window treatment, comprising:
receiving a biography of a window, said biography comprising:
an image of the window and a reference strip proximate the window, and biographical data associated with the window; and
generating a proposed window treatment solution from the biography.

23. The method of claim 22, further comprising manufacturing a window treatment in accordance with the proposed window treatment solution.

24. The method of claim 22, further comprising installing the window treatment.

25. The method of claim 22, further comprising providing the proposed window treatment solution to a customer for approval.

26. The method of claim 22, further comprising verifying a measurement of said biographical data using the reference tool of the image.

27. The method of claim 22, wherein said biographical data comprises at least one measurement of the window.

28. The method of claim 22, further comprising placing an L-shaped fixture adjacent said window so that said image includes said L-shaped fixture.

29. The method of claim 22 wherein said generating a proposed window treatment solution from the biography comprises lifting an image of the reference strip from the image and scaling the proposed window treatment solution from the image of the reference strip.

30. A method of manufacturing a window treatment, comprising:
generating a biography of a window, said biography comprising:
an image of the window and a reference strip proximate the window, and biographical data associated with the window; and
providing the biography to a party.

31. A window biography, comprising:
an image showing a window and a reference strip proximate the window; and
biographic data associated with the window.

32. The window biography of claim 31, wherein said image is stored on a computer readable medium.

* * * * *